(12) United States Patent
Okamura

(10) Patent No.: US 6,510,184 B1
(45) Date of Patent: Jan. 21, 2003

(54) MULTI-CARRIER TRANSMISSION SYSTEM AND METHOD THEREOF

(75) Inventor: Yusaku Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,259

(22) Filed: Feb. 26, 1999

(30) Foreign Application Priority Data

| Feb. 27, 1998 | (JP) | 10-046535 |
| Jun. 19, 1998 | (JP) | 10-173723 |
| Dec. 24, 1998 | (JP) | 10-366982 |

(51) Int. Cl.⁷ .............................. H04K 1/10
(52) U.S. Cl. ...................... 375/260; 370/480
(58) Field of Search ................. 375/260, 259, 375/296, 295, 285, 224, 225, 227, 240, 219; 370/480, 485, 493

(56) References Cited

U.S. PATENT DOCUMENTS

| 5,479,447 A | 12/1995 | Chow et al. |
| 5,636,246 A | 6/1997 | Tzannes et al. |
| 6,229,855 B1 * | 5/2001 | Takatori et al. |
| 6,317,495 B1 * | 11/2001 | Gaikwad et al. |

FOREIGN PATENT DOCUMENTS

| AU | B-58328/96 | 1/1997 |
| EP | 0 753 948 A1 | 1/1997 |
| JP | 8-84162 | 3/1996 |
| JP | 9-51328 | 2/1997 |
| JP | 9-153905 | 6/1997 |
| JP | 9-275387 | 10/1997 |
| JP | 9-321809 | 12/1997 |
| JP | 10-503624 | 3/1998 |
| JP | 10-247955 | 9/1998 |
| JP | 11-168515 | 6/1999 |
| JP | 11-331106 A | 11/1999 |
| WO | 98/57472 | 12/1998 |

* cited by examiner

*Primary Examiner*—Jean Corrielus
(74) *Attorney, Agent, or Firm*—Sughrue Mion, PLLC

(57) ABSTRACT

A multi-carrier transmission system and a method thereofor employing a bit distribution method capable of solving the problem set forth above by regarding a plurality of SNR values evaluated at different timings as one SNR value evaluated at different frequency at the same timing and is capable of solving the problem set forth above by realizing a given transmission speed depending upon a plurality of SNR values evaluated at different timings and thus maximizing performance margin. The multi-carrier transmission system has signal to noise ratio evaluating means for obtaining a plurality sets of signal to noise ratio by evaluating signal to noise ratio of each of the multi-carriers at different timing respectively corresponding to a plurality of kinds of noise environments, and bit distribution means for performing bit distribution of each carrier depending upon one set of signal to noise ratio with taking a plurality of sets of signal to noise ratios as one set of signal to noise ratio evaluated on different frequency at the same timing.

35 Claims, 13 Drawing Sheets

FIG.5 ONE EXAMPLE OF BIT DISTRIBUTION IN THE CASE WHERE INTERVAL OF NOISE PERIOD IS NOT EQUAL

FIG.9
ANOTHER EXAMPLE OF BIT DISTRIBUTION IN THE CASE WHERE NOISE PERIOD IS EQUAL INTERVAL
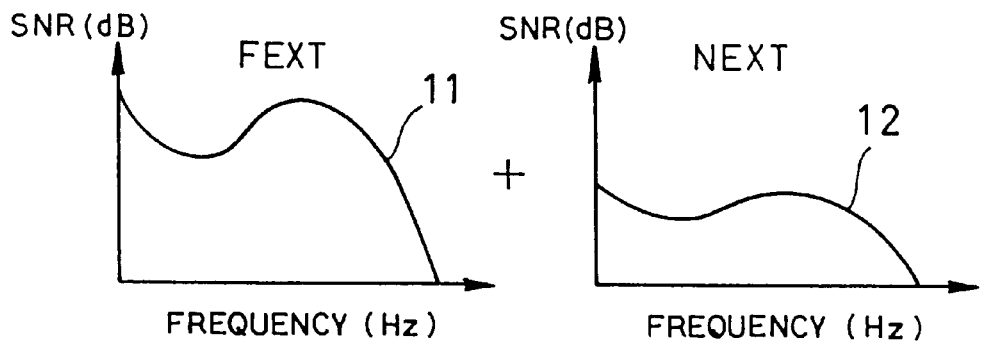
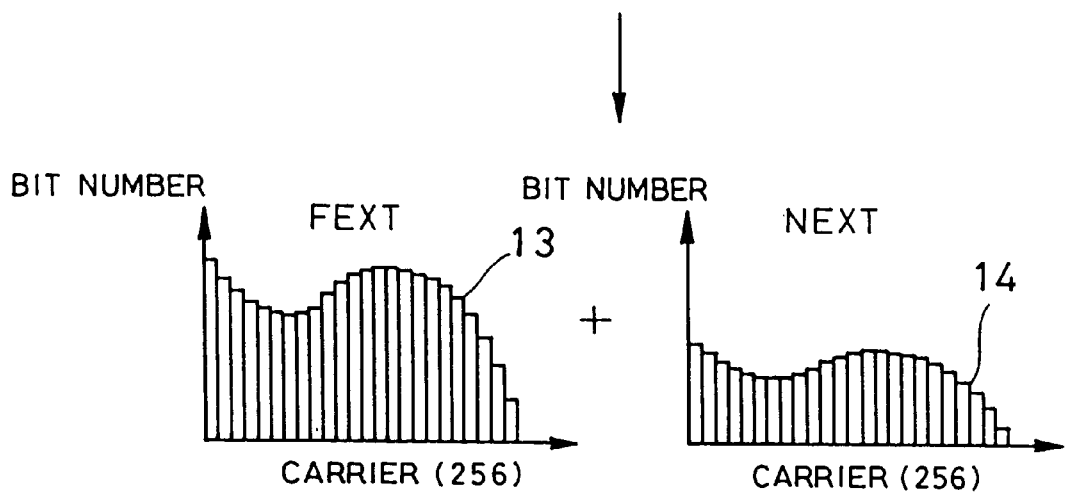

MULTI-CARRIER TRANSMISSION SYSTEM AND METHOD THEREOF

BACKGROUND OF THE INVENTION

1. Field of the Invention

The present invention relates generally to a multi-carrier transmission system and a transmission method. More particularly, the invention relates to a multi-carrier transmission system and a transmission method known as Discrete Multi-Tone (DMT) modulation system.

2. Description of the Related Art

A typical example of the conventional DMT type multi-carrier transmission system, there has been a technology disclosed in U.S. Pat. No. 5,479,447 to Chow et al.

An Asymmetric Digital Subscriber Line (ADSL) unit to be employed in the DMT system is designed to perform modulation for a plurality of carriers by Quadrature Amplitude Modulation (QAM) and to transmit the modulated carriers by multiplexing using Inverse Fast Fourier Transform (IFFT). On the receiver side, each carrier is extracted from the multiplexed reception signal using FFT to demodulate into the QAM modulated signal.

In such case, a signal to noise ratio (SNR) of each carrier is measured for bit distribution for each of a plurality of carriers, and the bit distribution is derived according to the measured SNR. For example, as identified by 15 in FIG. 13, the frequency on the horizontal axis is each carrier to be used or transmission. A frequency band of each carrier is 4.3125 Hz and total number of the frequency bands is 256. Each of these values is not specific and limitative. Upon data transmission, the carriers are modulated respectively. At this time, a value of SNR is evaluated to derive bit distribution according to the evaluated SNR. In this case, in evaluation of SNR, respective SNR values are derived at respective frequency bands of the carriers.

Each carrier performs transmission at a bit number according to each of bit distributions thus determined. The bit number is determined on the basis of the evaluated SNR so that a given transmission speed can be satisfied and a performance margin becomes maximum.

One example of a method for calculating the bit distribution to provide the maximum performance margin in the transmission speed in the conventional DMT type ADSL technology, has been disclosed in the above-identified U.S. Pat. No. 5,479,447. FIG. 13 illustrates one example of the bit distribution method set forth above. Once, a desired transmission speed (bit rate) is given, number of bits is distributed for each carrier (16) so that each carrier may have the maximum performance margin on the basis of the SNR value (15) of the measured transmission path.

In the DMT type ADSL technology, in Japan, a Time Compression Multiplexing (TCM) type ISDN is present within the same cable. A periodic crosstalk caused by presence of the TCM type ISDN causes substantial noise in a signal for the ADSL. Here, discussion will be given for crosstalk to be generated when ADSL line and TCM-ISDN line are commonly present in the same cable, with reference to FIG. 14. FIG. 14 illustrates crosstalk to be caused by ADSL Termination Unit-Remote side (ATU-R) due to data transmission by the TCM-ISDN line while data transmission is performed from a down direction (a direction of ADSL Termination Unit-Center side (ATU-C)) to the ATU-R in the ADSL line.

As shown in FIG. 14, while data transmission in the down direction is performed in the ADSL line, if data transmission in the down direction is performed by the TCM-ISDN line, Far End Crosstalk (FEXT) is caused. On the other hand, if data transmission in an up direction is performed the TCM-ISDN line while data transmission in the down-direction is performed in the ADSL line, Near End Crosstalk (NEXT) is caused. In the TCM type ISDN line, data transmission is performed alternately in up direction and down direction. Therefore, due to influence of Ping-Pong type data transmission of the ISDN line, near end crosstalk and far end crosstalk are caused periodically in the ADSL line.

When communication is performed by the conventional ADSL technology, due to periodic crosstalk, large amount of error is caused at the occurrence of near end crosstalk (NEXT) in bad noise condition. On the other hand, when the transmission speed is calculated adapting to communication under NEXT noise, the transmission speed is lowered significantly. Under a condition where a crosstalk noise from the ISDN is present, so-called dual bit map system is considered for improving communication performance of the ADSL unit. In this system, ADSL unit employs a system which has two bit maps (bit distributions) and changes communication speeds by switching the bit map in synchronism with the period of the crosstalk noise. Upon occurrence of the far end crosstalk (FEXT), communication speed is set high for low noise level, and upon occurrence of NEXT, communication speed is set low for high noise level.

However, since a plurality of the SNR values of the transmission line in the dual bit map system are present, it is not possible to perform bit distribution from the bit rate (transmission speed) given from the larger level. Namely, it is necessary that, on the basis of the measured SNR values, the given bit rate is distributed to two kinds of transmission speed and bit number is distributed for respective carriers.

For the problems set forth above, if noise amount on the line is periodically varied and a plurality of transmission speed is switched in synchronism with variation of the noise, maximum performance margin cannot be obtained by the conventional bit distribution method.

SUMMARY OF THE INVENTION

It is an object of the present invention to provide a multi-carrier transmission system and a method therefor employing a bit distribution method capable of solving the problem set forth above by regarding a plurality of SNR values evaluated at different timings as one SNR value evaluated at different frequency at the same timing.

Another object of the present invention to provide a multi-carrier transmission system and a method therefor employing a bit distribution method capable of solving the problem set forth above by realizing a given transmission speed depending upon a plurality of SNR values evaluated at different timings and thus maximizing performance margin.

According to the first aspect of the present invention, a multi-carrier transmission system performing data transmission between first and second communication stations under presence of a plurality of periodically varying noises, comprises:

signal to noise ratio evaluating means for obtaining a plurality sets of signal to noise ratio by evaluating signal to noise ratio of each carrier of the multi-carriers at different timing respectively corresponding to a plurality of kinds of noise environments; and bit distribution means for performing bit distribution of each carrier depending upon one set of signal to noise ratio with taking a plurality of sets of signal to noise ratios as one set of signal to noise ratio evaluated on different frequency at the same timing.

In the construction set forth above, the signal to noise ratio evaluating means may be constructed to derive the set of the signal to noise ratio corresponding to each of two kinds of noise environments when two kinds of noise environments varies in regular interval period, and the bit distribution means may be constructed for establishing the bit distribution with taking two kinds of signal to noise ratio sets as the one signal to noise ratio set. On the other hand, the signal to noise ratio evaluating means may be constructed to derive the set of the signal to noise ratio corresponding to each of two kinds of noise environments when two kinds of noise environments varies irregular interval period, and the bit distribution means may be constructed for establishing the bit distribution with taking two kinds of signal to noise ratio sets as the one signal to noise ratio set. Also, the bit distribution means may perform bit distribution depending upon the one signal to noise ratio set and a power restriction value of each of the carriers.

According to the second aspect of the present invention, a multi-carrier transmission system performing data transmission between first and second communication stations under presence of a plurality of periodically varying noises, comprises:

signal to noise ratio evaluating means for obtaining a plurality sets of signal to noise ratio by evaluating signal to noise ratio of each carrier of the multi-carrier at different timing respectively corresponding to a plurality of kinds of noise environments; and bit distribution means for performing bit distribution of each carrier for realizing a given transmission speed and a maximum performance margin depending upon respective values of a plurality of signal to noise ratio sets.

In the construction set forth above, the signal to noise ratio evaluating means may be constructed to derive the set of the signal to noise ratio corresponding to each of two kinds of noise environments when two kinds of noise environments vary in regular interval period, and the bit distribution means may be constructed for establishing the bit distribution with taking two kinds of signal to noise ratio sets as the one signal to noise ratio set. On the other hand, the signal to noise ratio evaluating means may be constructed to derive the set of the signal to noise ratio corresponding to each of two kinds of noise environments when two kinds of noise environments vary irregular interval period, and the bit distribution means may be constructed for establishing the bit distribution with taking two kinds of signal to noise ratio sets as the one signal to noise ratio set. The bit distribution means may perform bit distribution depending upon the one signal to noise ratio set and a total transmission power restriction value.

In case of data transmission from the first communication station to the second communication station, the first communication station may include means for transmitting predetermined plurality of transmission speed to the second communication station and the second communication station may have the signal to noise ratio evaluating means and the bit distribution means, the bit distribution means may include means for deriving a margin in data transmission on the basis of a plurality of transmission speed transmitted from the first communication station, means for selecting an optimal transmission speed from the plurality of transmission speed on the basis of the derived margin, and means for deriving bit distribution of each of the carriers according to the selected transmission speed. The second communication station may include means for transmitting the bit distribution to the first communication station, and the first communication station may performs data transmission to the second communication station according to the bit distribution. Noise source of the two kinds of noises may be present on a common cable with a communication line between the first and second communication stations. The two kinds of noise environments may be a first noise environment and a second noise environment having worse noise condition than the first noise environment. The two kinds of noises may be caused by far end crosstalk and near end crosstalk. A communication line for data transmission between the first and second communication stations may be a digital subscriber line.

According to the third aspect of the present invention, a multi-carrier transmission method performing data transmission between first and second communication stations under presence of a plurality of periodically varying noises, comprises:

signal to noise ratio evaluating step of obtaining a plurality sets of signal to noise ratio by evaluating signal to noise ratio of each carrier of the multi-carriers at different timing respectively corresponding to a plurality of kinds of noise environments; and bit distribution step of performing bit distribution of each carrier depending upon one set of signal to noise ratio with taking a plurality of sets of signal to noise ratios as one set of signal to noise ratio evaluated on different frequency at the same timing.

In the method set forth above, the signal to noise ratio evaluating step may be designed to derive the set of the signal to noise ratio corresponding to each of two kinds of noise environments when two kinds of noise environments vary in regular interval period, and the bit distribution step may be designed for establishing the bit distribution with taking two kinds of signal to noise ratio sets as the one signal to noise ratio set. The signal to noise ratio evaluating step may be designed to derive the set of the signal to noise ratio corresponding to each of two kinds of noise environments when two kinds of noise environments vary irregular interval period, and the bit distribution step may be designed for establishing the bit distribution with taking two kinds of signal to noise ratio sets as the one signal to noise ratio set. The bit distribution step may perform bit distribution depending upon the one signal to noise ratio set and a power restriction value of each of the carriers.

According to the fourth aspect of the present invention, a multi-carrier transmission method performing data transmission between first and second communication stations under presence of a plurality of periodically varying noises, comprises:

signal to noise ratio evaluating step of obtaining a plurality sets of signal to noise ratio by evaluating signal to noise ratio of each carrier of the multi-carriers at different timing respectively corresponding to a plurality of kinds of noise environments; and bit distribution step of performing bit distribution of each carrier for realizing a given transmission speed and a maximum performance margin depending upon respective values of a plurality of signal to noise ratio sets.

The second communication station may include step of transmitting the bit distribution to the first communication station, and the first communication station may perform data transmission to the second communication station according to the bit distribution.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 9 is an illustration showing another example of bit distribution in the case where the noise period is equal interval;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
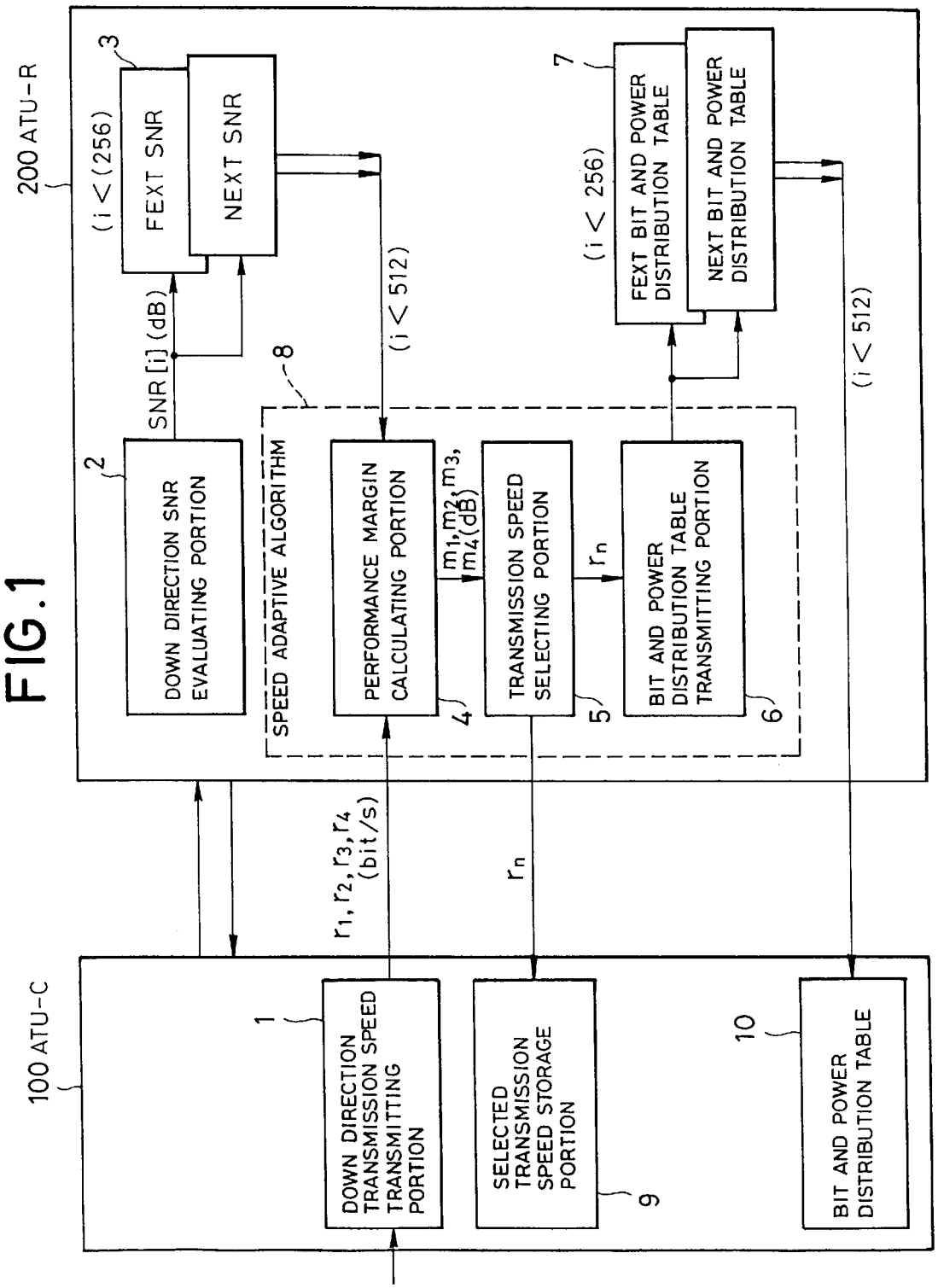
FIG. 1 is a block diagram showing a preferred embodiment of a multi-carrier transmission system according to the present invention.

FIG. 1 is a block diagram showing the preferred embodiment 10 of a multi-carrier transmission system according to the present invention. Referring to FIG. 1, an ATU-C 100 as a central office and an ATU-R 200 as terminal are provided, respectively. Transmission between the ATU-C 100 and the ATU-R 200 is performed through a digital subscriber line. It should be noted that, in the shown embodiment, discussion will be given for determination of a transmission speed in down direction transmitting from the ATU-C 100 to the ATU-R 200. A down transmission speed transmitting portion 1 is designed for transmitting down transmission speeds r1 to r4 (four kinds of speeds r1 to r4 the shown embodiment) designated from a not shown upper level, to the ATU-R.

A selected transmission speed storage portion 9 is designed for storing a transmission speed rn selected by the ATU-R 200. A bit and power distribution table 10 stores a bit and power distribution table transmitted from the ATU-R 200. According to the bit and power distribution table 10, data transmission in down direction is performed with effecting bit distribution and power distribution (mapping) of respective carriers.

Figure 2:
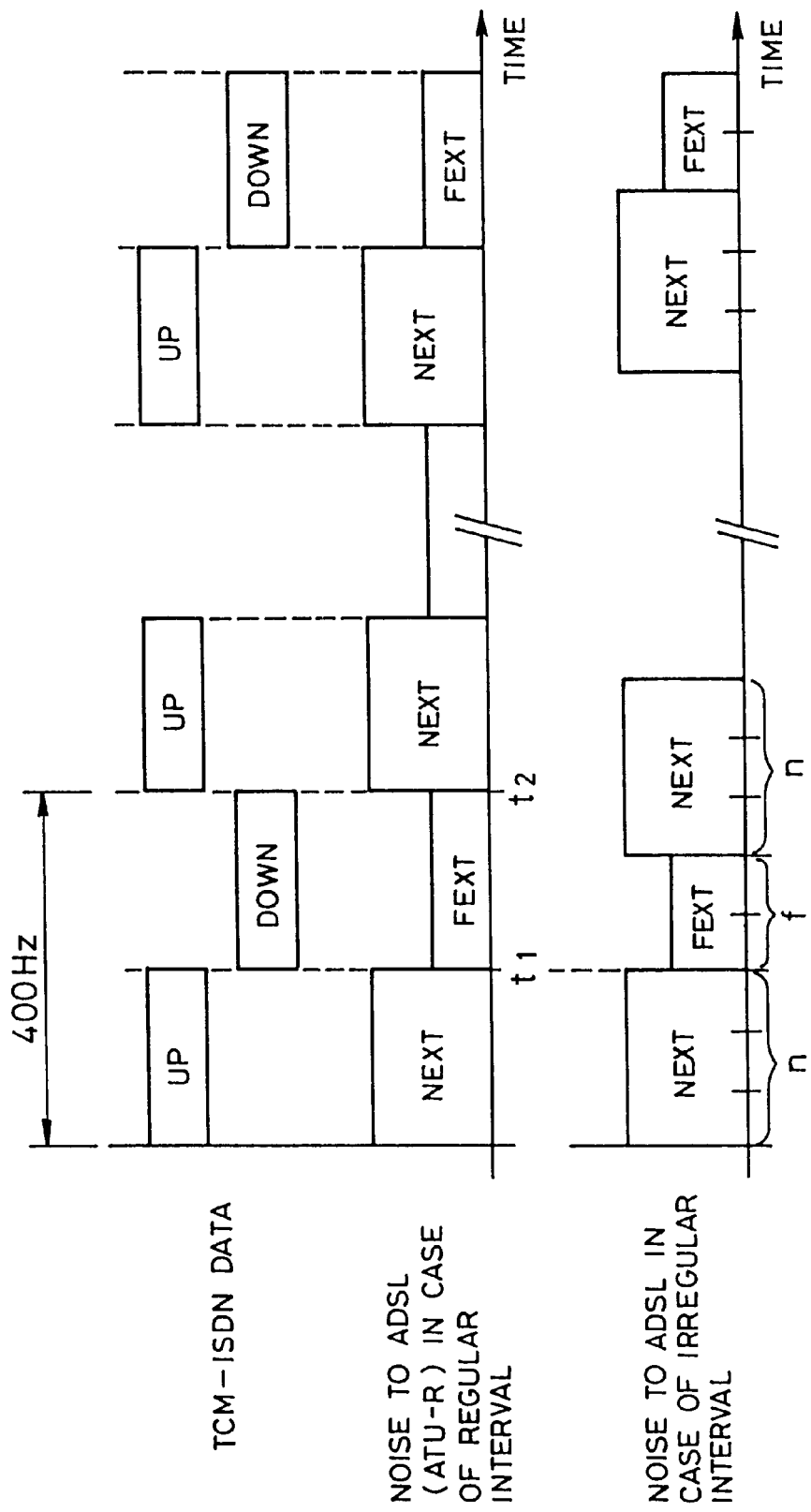
FIG. 2 is a showing a relationship between a TCM-ISDN data and a noise condition to ADSL.

The foregoing is the function of the ATU-C 100. On the other hand, the function of the ATU-R 200 is as follow. A down direction SNR evaluating portion 2 performs an SNR evaluation of a transmission line upon down transmission, Here, as an example, discussion will be given for the case where a TCM-ISDN and an ADSL are present in the same cable and a crosstalk therebetween varies periodically. FIG. 2 is an illustration for explaining crosstalk from the TCM-ISDN to the ADSL and shows a relationship between a transmission speed of data of the TCM-ISDN and a crosstalk caused for the ADSL(ATU-R).

Upon up transmission of the ISDN, near end crosstalk NEXT is caused in the ATU-R, and upon down transmission, far end crosstalk FEXT is caused. Therefore, the down direction SNR evaluating portion 2 evaluates (calculates) sets of SNR values at each carrier frequencies respectively in the case where two kinds of noises NEXT and FEXT are present, and corresponding sets of SNR are held in respective holding portions 3 of NEXT SNR and FEXT SNR. It should be noted that FIG. 2 shows the case where a time interval of the crosstalk noise is equal and the case where the time interval is not equal, respectively. In FIG. 2, f and n are time ratio of a period where a noise is generated. In FIG. 2, f represents a period where FEXT is generated and n represents a period where NEXT is generated. In shown case, the period f of FEXT is shorter than the period n of NEXT.

A speed adaptive algorithm portion 8 includes a performance calculating portion 4, a transmission speed selecting portion 5 and a bit and power distribution table transmitting portion 6. The performance margin calculating portion 4 calculates four kinds of maximum performance margin values when four kinds of transmission speeds transmitted from the ATU-C 100 are realized on the basis of the SNR value 3 of the line evaluated by the down direction SNR evaluating portion 2. The transmission speed selecting portion 5 selects a value at which the transmission can be performed and a transmission speed is maximum, from four kinds of performance margin values thus derived. The bit and power distribution table transmitting portion 6 transmits the bit and power distribution table to the ATU-C 100 for performing transmission at the selected transmission speed rn. The bit and power distribution table 7 stores respective sets of SNR values varying periodically upon occurrence of NEXT and FEXT.

Figure 3:
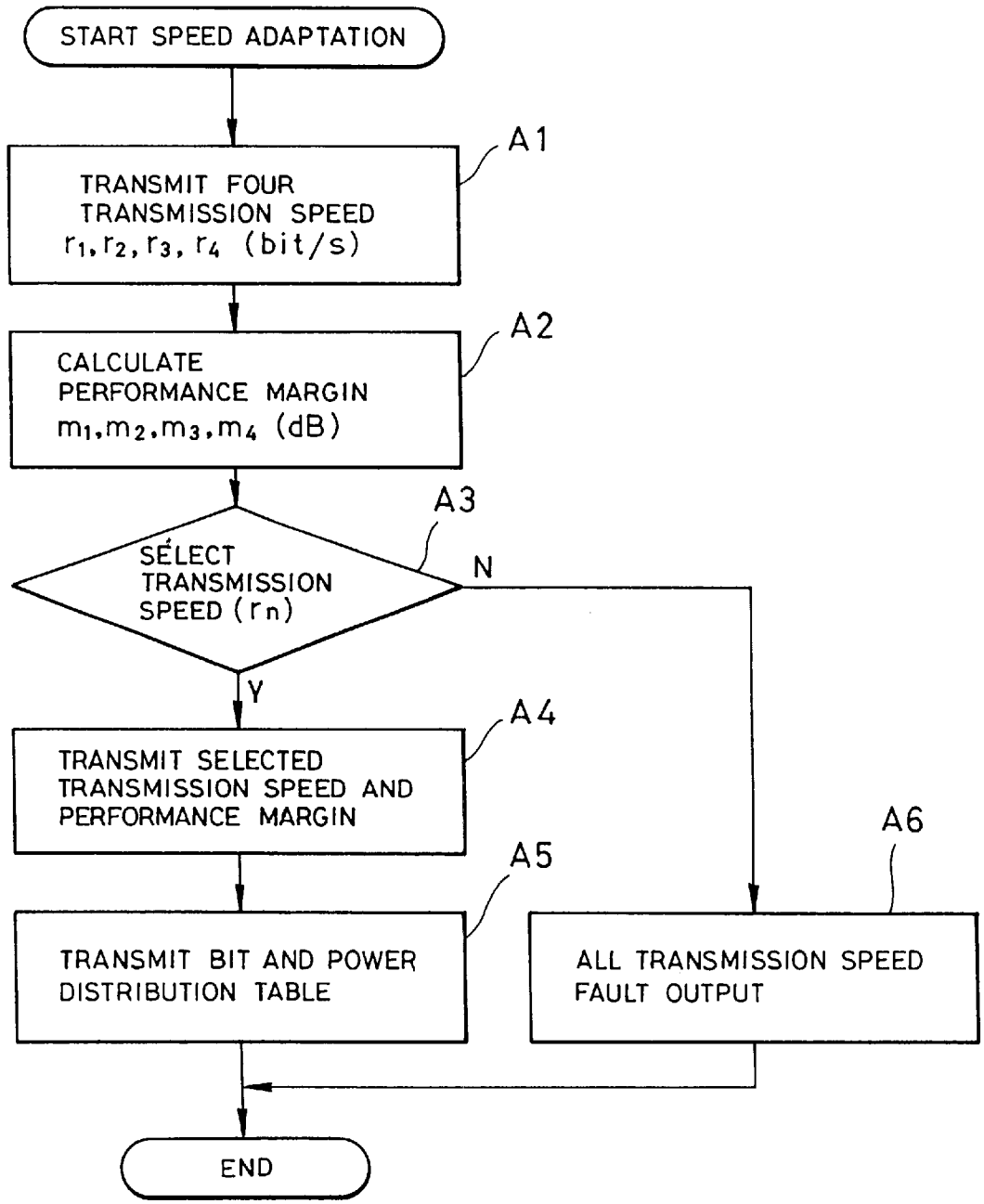
FIG. 3 is a flowchart showing an operation of the blocks in the preferred embodiment of the multi-carrier transmission system of FIG. 1.

FIG. 3 is a flowchart showing operation of the various blocks in the preferred embodiment of the multi-carrier transmission system of FIG. 1. Four transmission speeds provided from the upper level are transmitted from the ATU-C to the ATU-R (step A1). For example, four kinds of the transmission speeds of r1 to r4 bit/s are transmitted from the ATU-C to the ATU-R together with other parameters. On the ATU-R side, when the noise amount is varied periodically, particularly when TCM-ISDN is present within the same cable, NEXT and FEXT are caused from ISDN to ADSL. In the down direction SNR evaluating portion 2, the SNR values at respective frequencies are evaluated in both cases of occurrence of NEXT and FEXT to store respective of evaluated SNR values in NEXT SNR and FEXT SNR holding portions 3. The reference numerals 11 and 12 of FIG. 4 show the evaluated SNR values of respective frequencies, in which 11 represents the SNR value at the occurrence of FEXT and 12 represents the SNR value at the occurrence of NEXT.

The performance margin calculating portion 4 calculates four kinds of bit distributions to be set at values where the performance margin becomes maximum on the basis of the SNR values of the line evaluated by the SNR evaluating portion 2, upon realizing the transmitted four transmission speeds (step A2). FIG. 4 shows the calculation method. The SNR values at the occurrences of NEXT and FEXT shown by 11 and 12 are used as evaluated SNR values up to double of the frequency instead of varying periodically, as shown by 13 in FIG. 4.

Figure 4:
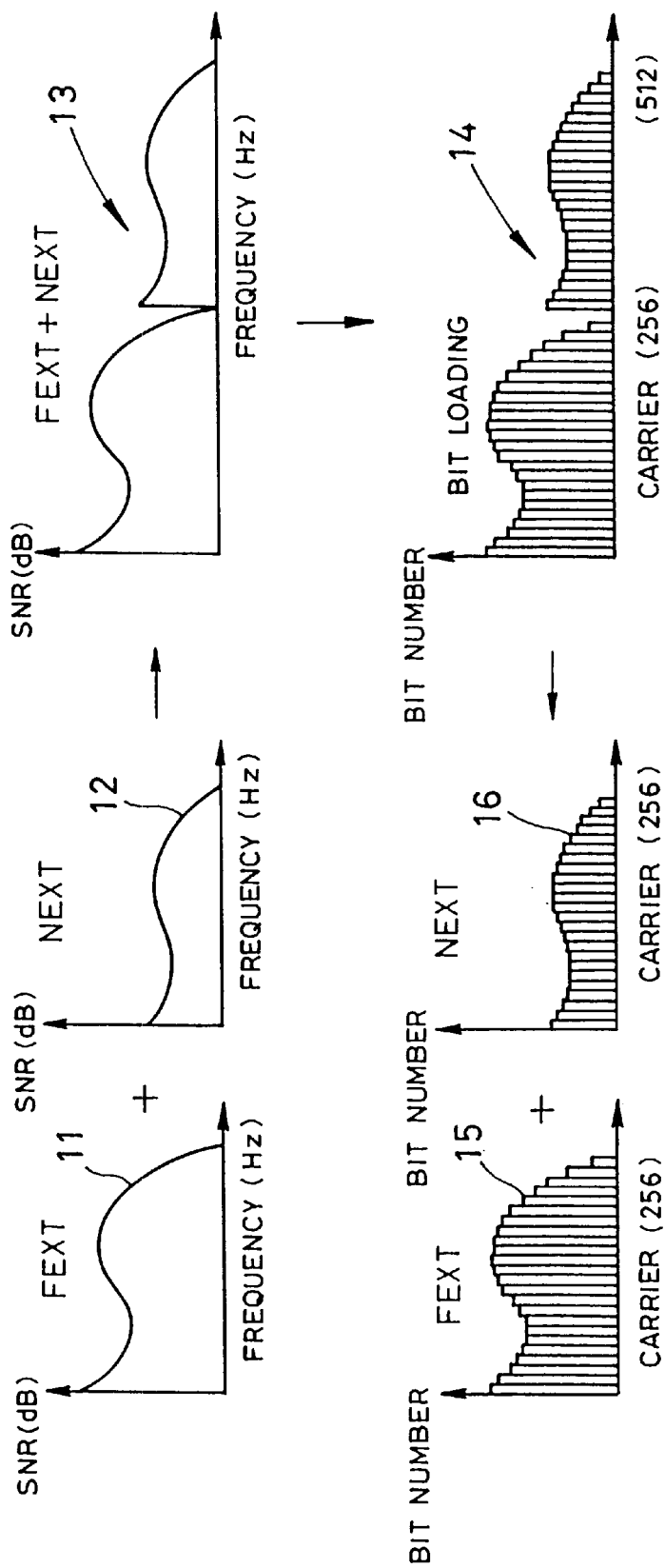
FIG. 4 is an illustration showing an example of a bit distribution in the case where noise period is equal interval.

By this, upon calculation of the performance margin of the line, the bit distribution method is used regarding as the case where the transmission speed is double of the value of the given transmission speed and 512 carriers are used concerning the line where a used frequency band width is double and have no SNR value variation in time as shown by 13 in FIG. 4. The shown-embodiment is the case where power of each carrier is restricted. An upper limit of the power of each carrier is assumed as $E_{mask}$. Here, an upper limit $E_{target}$ of a total transmission power useful for data transmission is set as (all carrier number)×(upper limit $E_{mask}$ of power of each carrier), and the transmission power useful for each carrier is not restricted by the upper limit of the total transmission power.

In the transmission speed selecting portion 5, from the calculated four kinds of performance margin, e.g. four kinds of margin values m1 to m4, the transmittable transmission speed which is the highest and the margin is not negative is selected (step A3). If all margins are negative concerning all transmission speeds, it represents that all four transmission speeds are not transmittable (step A6). Then, the ATU-R transmits all transmission speeds fault output to the ATU-C. If any one of the transmission speeds can be selected, the selected transmission speed and the performance margin are transmitted to the ATU-C (step A4).

In the bit and power distribution table transmitting portion 6, the bit and power distribution table necessary for transmission at the selected transmission speed is transmitted (step A5). In order to obtain this table, it is required to calculate the SNR values varying periodically upon occurrence of NEXT and FEXT. As the bit and power distribution table, a portion of the bit and power distribution table 7 derives for the case where 512 carriers are used, corresponding to former 256 carriers is used as FEXT table, and a portion corresponding to later 256 carriers is used as NEXT table. Respective of calculated tables are transmitted from the ATU-R to the ATU-C.

Figure 5:
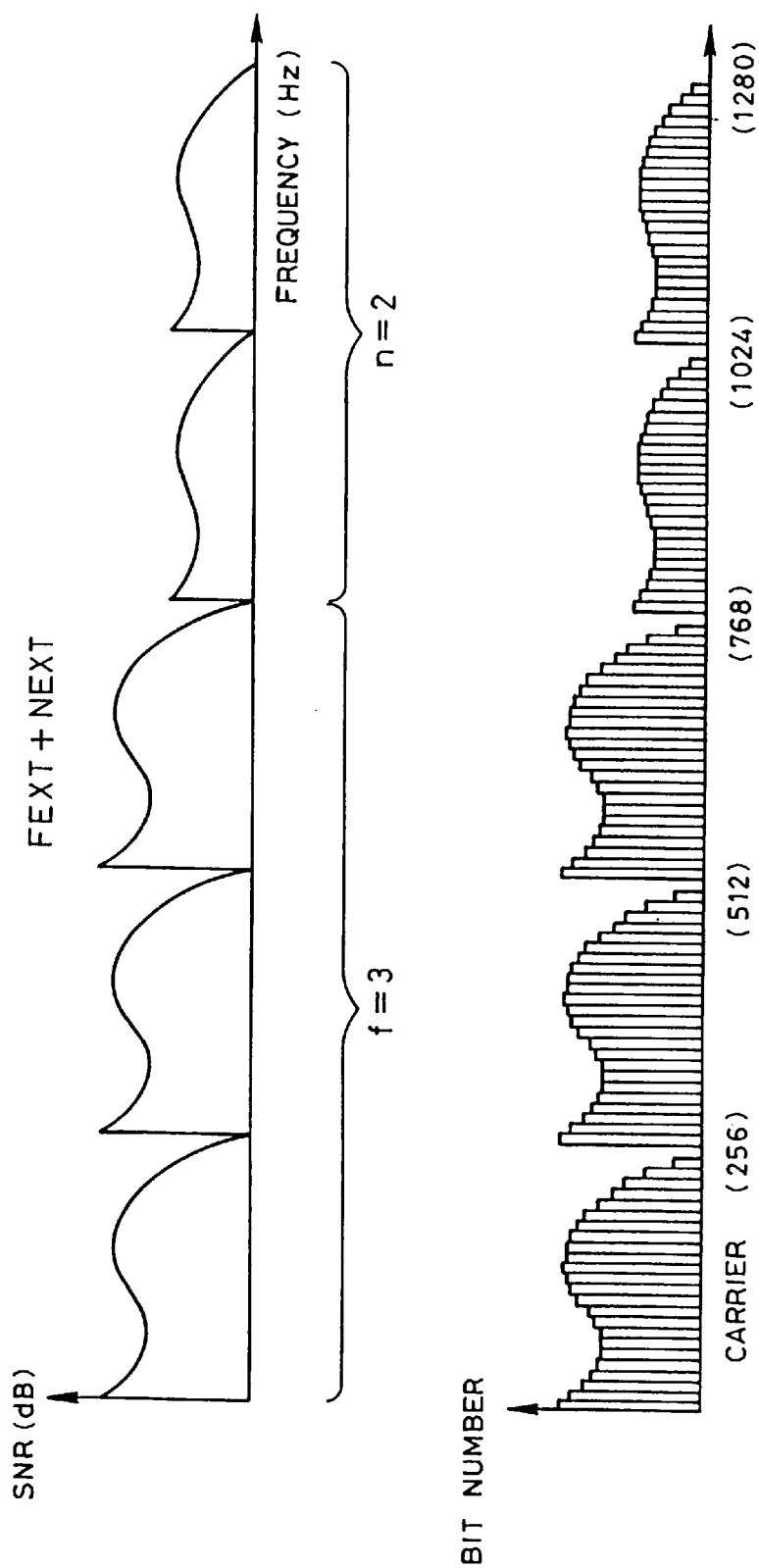
FIG. 5 is an illustration showing an example of a bit distribution in the case where noise period is not equal interval.

On the other hand, when variation period of the noise on the transmission line is not equal interval as shown in FIG. 2, and when a plurality of SNR values are made into a single SNR value, the frequency corresponding to the SNR value is increased in a magnitude corresponding to the ratios f and n of the time interval. FIG. 5 shows a calculation method of the bit distribution. As shown in FIG. 5, the SNR values at the occurrence of NEXT value and FEXT value shown by 11 and 12 of FIG. 4 are used with extending the SNR value at the occurrence of FEXT up to the f times of frequency and the SNR value at the occurrence of NEXT up to the n times of frequency. Regarding that transmission speed is f+n times of the value of the given transmission speed and the line used (f+n)×256 carriers, the bit distribution method showing in the lower side of FIG. 5 is used.

As the bit and power distribution table to be used in data transmission, in case of the table to be used upon occurrence of FEXT, the bit and power distribution table to be assigned for one group of carriers using the SNR values upon occurrence of FEXT is used. Similarly, as the table at the occurrence of NEXT, a table assigned for one group of carriers using the SNR values upon occurrence of NEXT. For example, in the case calculated assuming that (3+2)×256=1280 carries are used, a portion corresponding to 0 to 255 carriers is taken as FEXT, and a portion corresponding to 768 to 1023 carriers is taken as NEXT table.

The calculated tables are transmitted from the ATU-R to the ATU-C and is held in the bit and power distribution table 10 to be used for bit and power distribution (mapping) upon down transmission.

Figure 6:
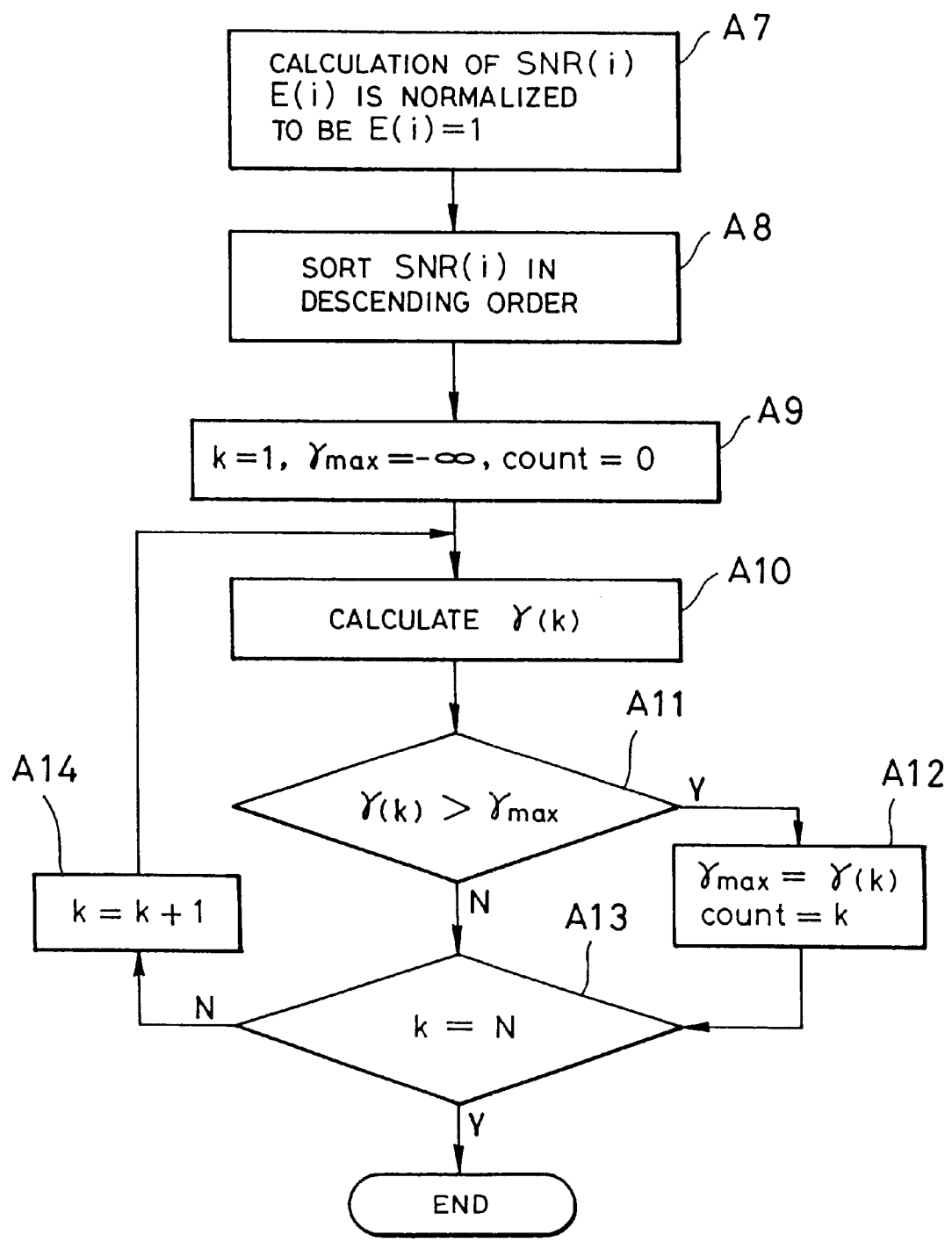
FIG. 6 is a flowchart showing a detail of step A2 in FIG. 3.

FIG. 6 is a flowchart showing a calculation method of the performance margin in step A2 of FIG. 3. At first, a normalized SNR(i) is derived with taking the transmission power of each carrier as E(i) (step A7). Then, the calculated SNR(i) is sorted in descending order (step A8), to re-assign the number to satisfy, $$SNR(i) \geq SNR(i+1)$$

It should be noted that for all number up to i smaller than total carrier number N, the foregoing inequality is applicable.

Next, it is assumed that k=1, $\gamma_{max}=-\infty$, count=0 (step A9). k is a counter, $\gamma_{max}$ is a current possible maximum system performance margin, and count is a number of carriers to be used for achieving $\gamma_{max}$. Then, calculation of γ(k) is performed (step A10).

The equation for calculating γ (k) is as follow:

$$\gamma(k) = 10\log_{10}\left\{\frac{\overline{SNR(k)}}{2^{\frac{Btarget}{k}}-1}\right\} + \gamma_{eff} - 9.8(\text{dB}) \quad \text{[Equation 1]}$$

γ(k) is the maximum system performance margin which can be achieved in one carrier symbol. At this time, a target speed to be achieved is $B_{target}$, total effective coding gain is $\gamma_{eff}$, a desired bit error rate is $10^{-7}$, and the k in number of the best carriers are used. Then, a current geometric average SNR is expressed by:

$$\overline{SNR(k)} = \left[\prod_{i=1}^{k} Ei \cdot SNR(i)\right]^{\frac{1}{k}} \quad \text{[Equation 2]}$$

A current transmission power $E_i$ used by (i)th order carrier is expressed by:

$$E_i = E_{maxi}$$

where a total input power $E_{target}$ restricted by a transmitter is expressed by:

$$E_{target} = k*E_{maxi}$$

wherein k is number of carriers to be used.

$E_{maxi}$ is the maximum power which can be transmitted by the (i)th order carrier. $E_{maxi}$ is determined by the transmission power mask. In this case, the maximum power which can be transmitted by each carrier is not restricted by the total input power $E_{target}$.

Then, when γ (k)>$\gamma_{max}$, $\gamma_{max}$=(k) and count k are set (steps A11 and A12). K is not N, k=k+1 is set (step A14). Then, process is returned to step A10. Here, $\gamma_{max}$ represents the possible maximum system performance margin at a given system parameter, and count becomes the best carrier number to be used for achieving $\gamma_{max}$.

Figure 7:
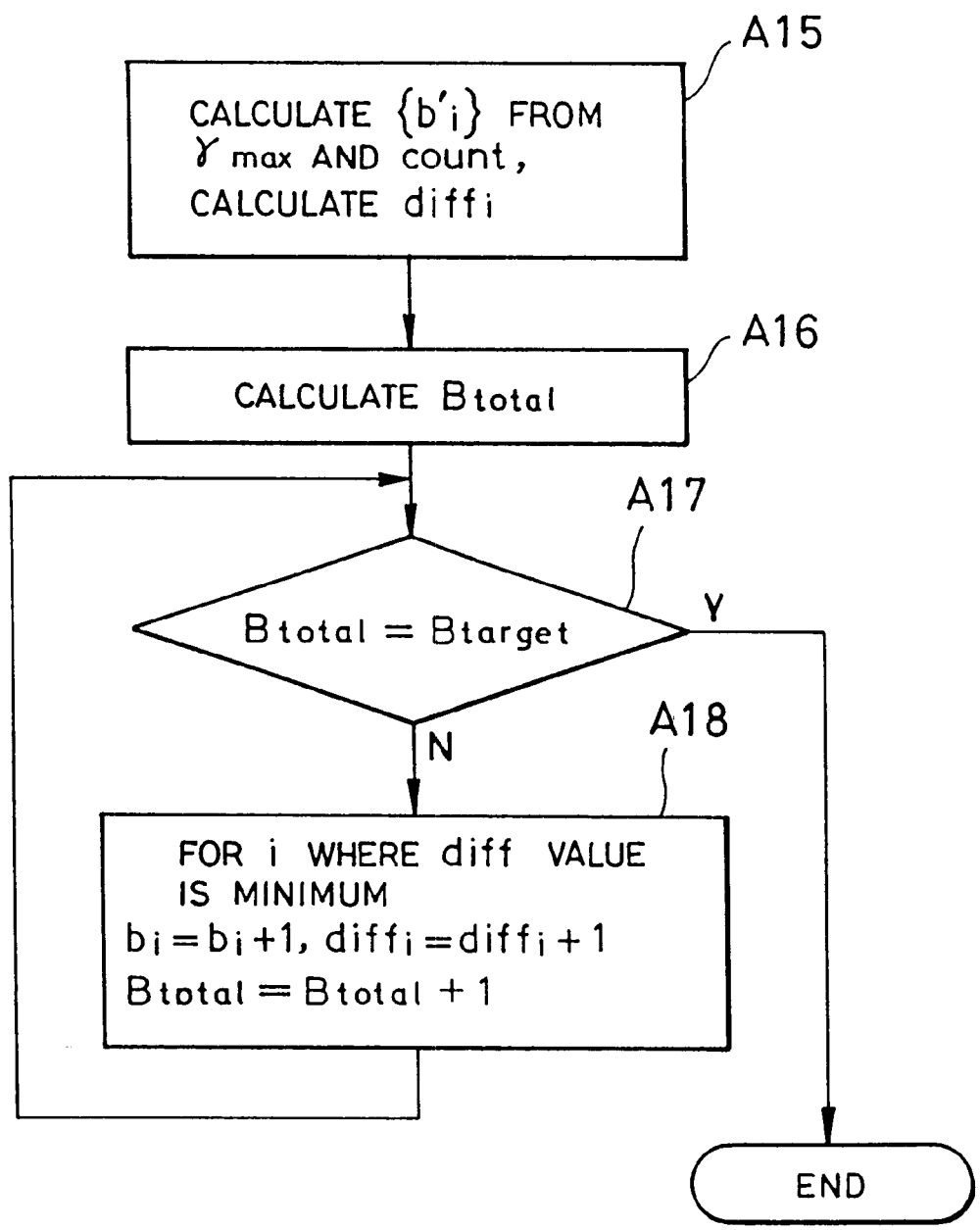
FIG. 7 is a flowchart showing a calculation method of a bit distribution at step A5 of FIG. 3.

FIG. 7 is a flowchart showing a calculation method of the bit distribution table at step A5 of FIG. 3. Using the foregoing $\gamma_{max}$ and count, the initial bit distribution table {b'i} is calculated by $$b_i = \text{floor}[\log 2\{1+E_{maxi}\, SNR(i)/\Gamma_{max}\}]$$

In the foregoing equation, floor represents cutting off at decimal point. A cut off value below decimal point is derived as $\text{diff}_i$ expressed as follow (step A15).

$$\text{diff}_i = b_i - \log 2\{1+E_{maxi}\, SNR(i)/\Gamma_{max}\}$$

Here, $\Gamma_{max}$ is expressed by $$\Gamma_{max} = \left[Q^{-1}\left(\frac{Pe}{Ne}\right)\right]^2 + \gamma_{max} - \gamma_{eff} - 4.77(\text{dB}) \quad \text{[Equation 3]}$$

wherein Pe is a bit error rate, $N_e$ is number of points having closest in an input signal constellation, and Q function is defined by the following equation.

$$Q(x) = \int_x^\infty \frac{1}{\sqrt{2\pi}} e^{-y^2/2} dy \quad \text{[Equation 4]}$$

Then, $B_{total}$ is calculated (step A16). $B_{total}$ is total bit number supported by the current bit distribution table at one multi-carrier symbol, in which $B_{total} = \Sigma b'i$. Here, $\Sigma$ is a sum of i=0 to N−1.

Figure 8:
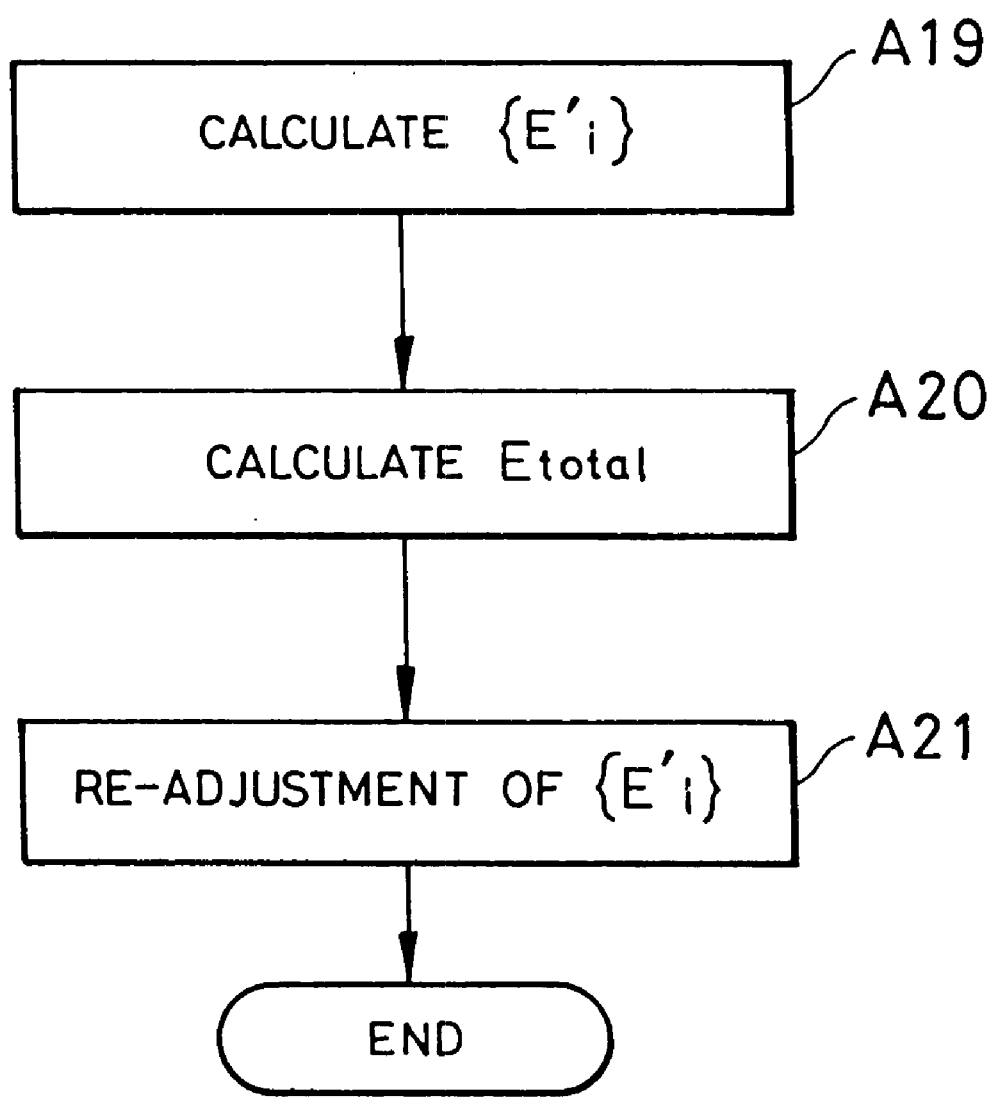
FIG. 8 is a flowchart showing a calculation method of a power distribution at step A5 of FIG. 3.

Then, when $B_{total} < B_{target}$, one bit is increased from the current bit distribution table, i.e. the bit distribution table {b'i} of the carrier having minimum $\text{diff}_i$ value to establish $\text{diff}_i = \text{diff}_i + 1$, $B_{total} = B_{total} + 1$ (steps A17 and A18). This process is repeated until $B_{total} = B_{total} + 1$ is established. FIG. 8 is a flowchart showing a calculation method of the power distribution table at step A5 of FIG. 3. At first, on the basis of the given bit distribution table {b'i} an input power {E'i} is assigned so that $P_e(i) = P_{e,i,target}$ is established (step A19). Here, $P_e(i)$ is an error probability of the (i)th order carrier, $P_{e,i,target}$ is a target error probability of the (i)th order carrier. It should be noted that {E'i} is a total transmission power to be used by the (i)th order carrier. The current total transmission power $E_{total}$ is derived by the following equation (step A20).

$$E_{total} = \Sigma E_i$$

Here, $\Sigma$ is a sum of i=0 to N−1.

Then, final power distribution {E'i} is re-adjusted (step A21). The re-adjustment can be performed by setting smaller one of $E_{target}/E_{total}$ and $E_{max,i}$ as $E_i$. The initial bit and the power distribution table in the shown system is provided as {b'i} and {E'i}.

Next, another embodiment of the multi-carrier transmission system according to the present invention will be discussed. The foregoing embodiment is directed to the case where transmission power of each carrier is restricted, the shown embodiment is directed to the case where total transmission power is restricted. Even in the shown embodiment, the construction of the multi-carrier transmission system is the same as that illustrated in FIG. 1, and operation thereof is the same as that illustrated in the flowchart of FIG. 3. In the shown embodiment, the four transmission speeds provided from the upper level is transmitted from the ATU-C to the ATU-R (step A1). For example, the four kinds of transmission speeds of r1 to r4 are transmitted from the ATU-C to the ATU-R together with other parameters.

On the ATU-R side, when the noise amount is varied periodically, particularly when TCM-ISDN is present in the same cable, NEXT and FEXT are caused from ISDN to ADSL. In the down direction SNR evaluating portion 2, SNR values at respective frequency in both cases of occurrence of NEXT and FEXT, are evaluated and respectively stored in NEXT SNR and FEXT SNR 3. The reference numerals 11 and 12 of FIG. 4 show the evaluated SNR values of respective frequencies, in which 11 represents the SNR value at the occurrence of FEXT and 12 represents the SNR value at the occurrence of NEXT.

The performance margin calculating portion 4 calculates four kinds of bit distributions to be set at values where the performance margin becomes maximum on the basis of the SNR values of the line evaluated by the SNR evaluating portion 2, upon realizing the transmitted four transmission speeds (step A2). FIG. 9 shows the calculation method. Bit distribution of the multi-carriers are respectively calculated so as to realize a given transmission speed and maximize performance margin in consideration of a plurality of SNR values evaluated at different timing and the total transmission power. At this time, as shown in FIG. 9, in consideration of the SNR values at the occurrence of NEXT and FEXT to be evaluated at different timing, and a total power upon data transmission, the bit distribution of each carrier in the multi-carrier is derived so that the transmission speed given by the ATU-C 100 is realized and the performance margin can be maximized.

In the transmission speed selecting portion 5, from the 20 calculated four kinds of performance margins, e.g. four kinds of margin values m1 to m4, the transmittable transmission speed which is the highest and the margin is not negative is selected (step A3). If all margins are negative concerning all transmission speed, it represents that all four transmission speeds are not transmittable. Then, the ATU-R transmits all transmission speeds fault output to the ATU-C (step A6). If any one of the transmission speeds can be selected, the selected transmission speed and the performance margin are transmitted to the ATU-C (step A4). In the bit and power distribution table transmitting portion 6, the bit and power distribution table necessary for transmission at the selected transmission speed is transmitted (step AS). This table is required to calculate the SNR values varying periodically upon occurrence of NEXT and FEXT. Respective of calculated tables are transmitted from the ATU-R to the ATU-C.

On the other hand, when variation period of the noise on the transmission line is not equal interval as shown in FIG. 2, and when a plurality of SNR values are made into a single SNR value, the frequency of the SNR value is increased in a magnitude corresponding to the ratios f and n of the time interval. FIG. 5 shows a calculation method of the bit distribution. As shown in FIG. 5, the SNR values at the occurrence of NEXT value and FEXT value shown by 11 and 12 of FIG. 4 are used with extending the SNR value at the occurrence of FEXT up to the f times of frequency and the SNR value at the occurrence of NEXT up to the n times of frequency. Regarding that transmission speed is f+n times of the value of the given transmission speed and the line used (f+n)×256 carriers, the bit distribution method showing in the lower side of FIG. 5 is used.

As the bit and power distribution table to be used in data transmission, in case of the table to be used upon occurrence of FEXT, the bit and power distribution table to be assigned for one group of carriers using the SNR values upon occurrence of FEXT is used. Similarly, as the table at the occurrence of NEXT, a table assigned for one group of carriers using the SNR values upon occurrence of NEXT is used. For example, in the case of FIG. 5 calculated assuming that (3+2)×256=1280 carries are used, a portion corresponding to 0 to 255 carriers is taken as FEXT table, and a portion corresponding to 768 to 1023 carriers is taken as NEXT table. The calculated tables are transmitted from the ATU-R to the ATU-C and is held in the bit and power distribution table 10 to be used for bit and power distribution (mapping) upon down transmission.

Figure 10:
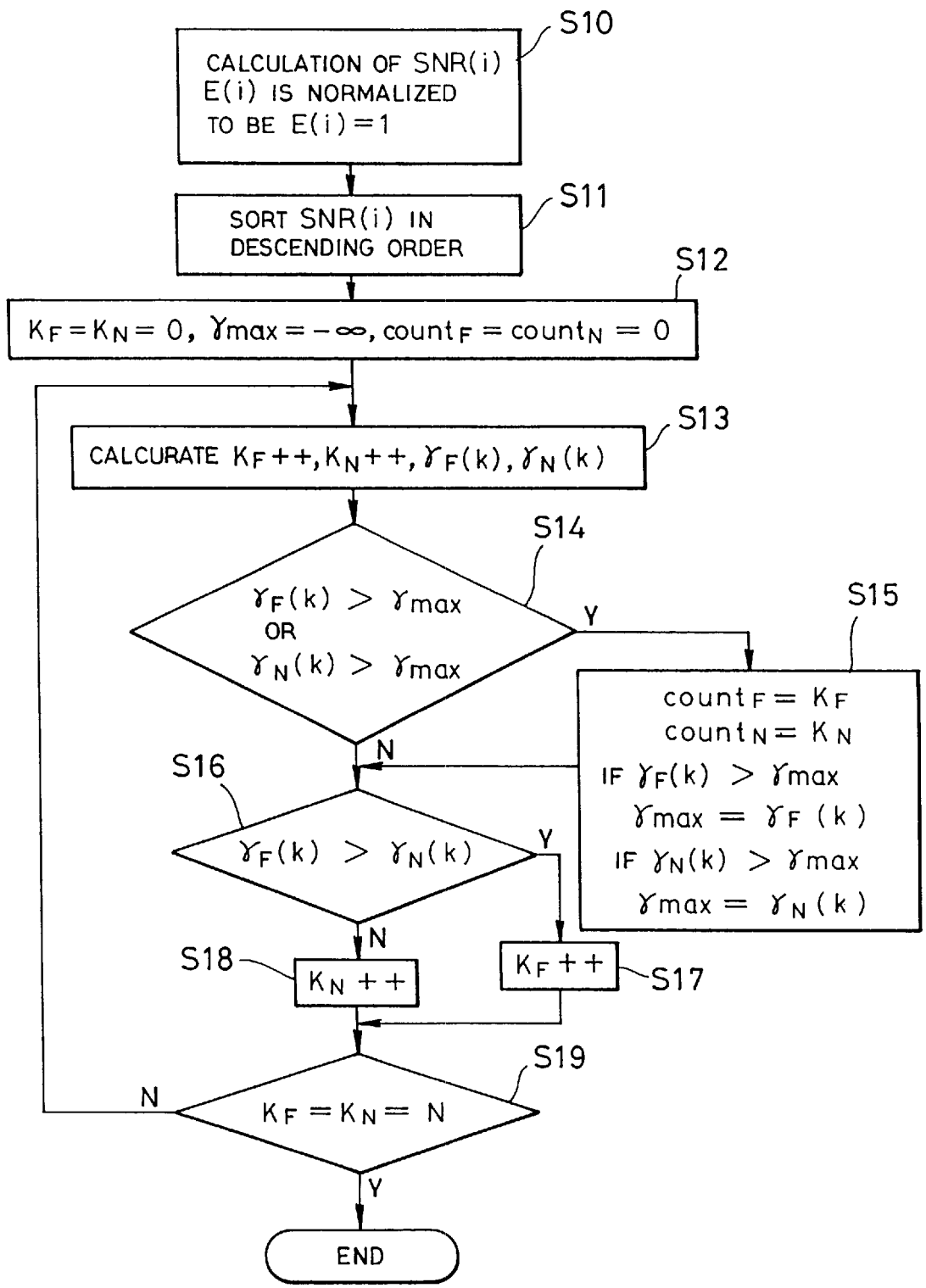
FIG. 10 is a flowchart showing another example of step A2 of FIG. 3.

FIG. 10 is a flowchart showing a calculation method of the performance margin in step A2 of FIG. 3. At first, a normalized SNR(i) is derived with taking the transmission power of each carrier as E(i) (step S10). Then, the calculated SNR(i) is sorted in descending order (step S11), to re-assign the number to satisfy, $$SNR(i) \geq SNR(i+1)$$

It should be noted that for all number up to i smaller than total carrier number N, the foregoing inequality is applicable.

Next, it is assumed that k=1, $K_F=K_N=0$, $count_F=count_N=0$, $\gamma_{max}=-\infty$ (step S12). k is a counter, $\gamma_{max}$ is a current possible maximum system performance margin, and $count_F$ and $count_N$ are a number of carriers to be used for achieving $\gamma_{max}$. Suffix F represents FEXT table and suffix N represents NEXT table, respectively. Then, calculation of $\gamma_F(k)$ and $\gamma_N(k)$ are performed (step S13). The equation for calculating $\gamma_F(k)$ and $\gamma_N(k)$ is the same as the foregoing equation (1).

$\gamma(k)$ is the maximum system performance margin which can be achieved in one carrier symbol. At this time, a target speed to be achieved is $B_{target}$, total effective coding gain is $\gamma_{eff}$, a desired bit error rate is $10^{-7}$, and the k in number of the best carriers are used. Then, a current geometric average SNR is the same as the foregoing equation (2).

A current transmission power $E_i$ used by (i)th order carrier is expressed by the following equation (5).

$$E_{i,F} = \min\left\{ \begin{array}{l} \frac{E_{target}}{K_F} \\ E_{maxi} \end{array} \right.$$ [Equation 5]

$$E_{i,N} = \min\left\{ \begin{array}{l} \frac{E_{target}}{K_N} \\ E_{maxi} \end{array} \right.$$

Here, a total input power $E_{target}$ restricted by a transmitter is expressed by:

$E_{maxi}$ is the maximum power which can be transmitted by the (i)th order carrier and is determined by the transmission power mask.

Then, when $\gamma_F(k)>\gamma_{max}$ or $\gamma_N(k)>\gamma_{max}$ (step S14/YES), it is assumed that $count_F=k_F$ and $count_N=K_N$, when $\gamma_F(K)>\gamma_{max}$, $\gamma_{max}=\gamma_F(k)$ when $\gamma_N(K)>\gamma_{max}$, $\gamma_{max}=\gamma_N(k)$ (step S15).

Then, when $\gamma_F(k)>\gamma_N(k)$ (step S16/YES), $K_F$++ is set (step S17), and otherwise (step S16/NO), $K_N$++ is set (step S18). Then, if $K_F=K_N=N$ is not established (step S19/NO), the process is returned to step S13. Here, $\gamma_{max}$ represents possible maximum system performance margin in the given system parameter, and $count_F$ and $count_N$ are the best carrier number for achieving $\gamma_{max}$.

Figure 11:
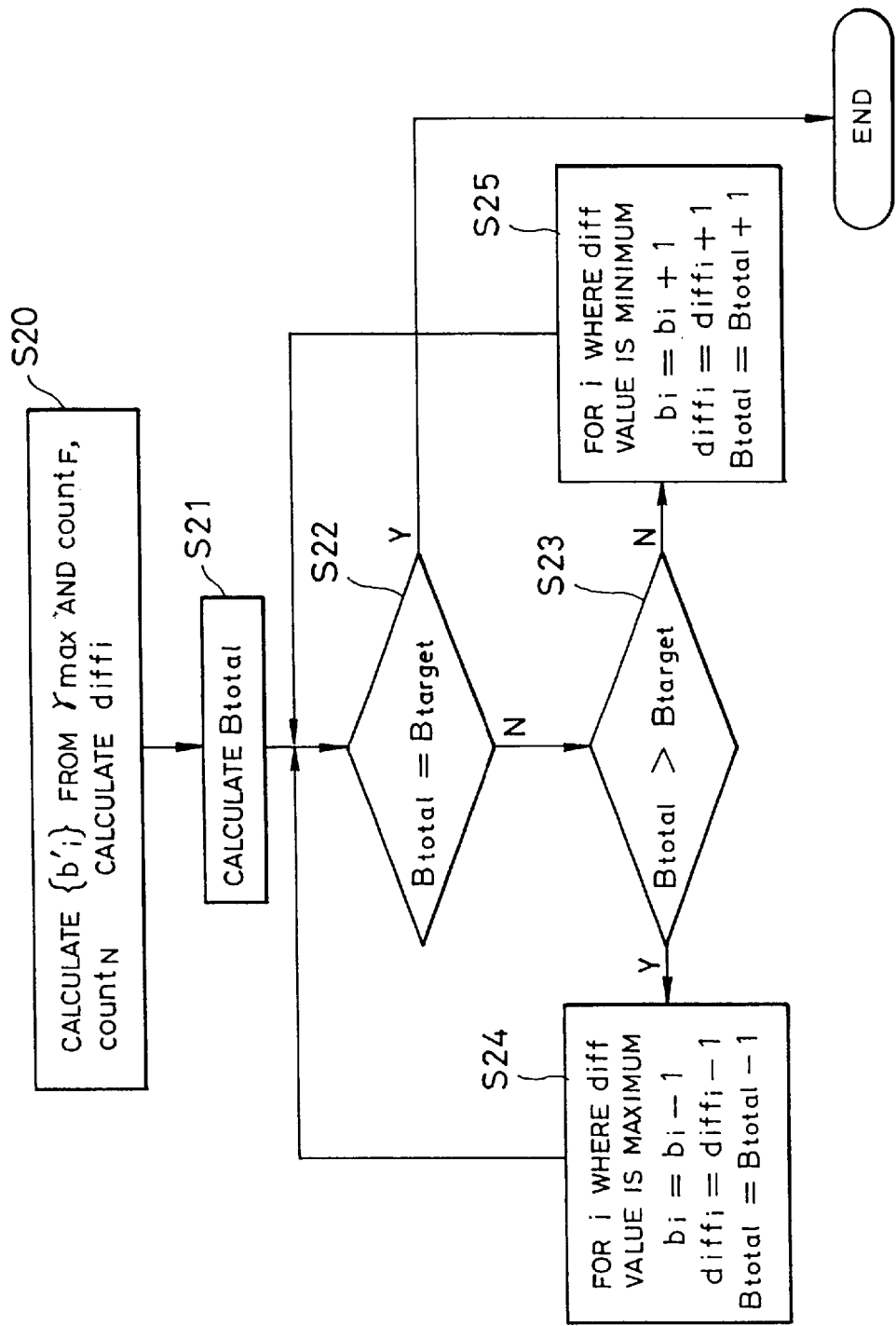
FIG. 11 is a flowchart showing another example of a calculation method of a bit distribution at step A5 of FIG. 3.

FIG. 11 is a flowchart showing a calculation method of the bit distribution table at step A5 of FIG. 3. Using the foregoing $\gamma_{max}$ and $count_F$, $count_N$, the initial bit distribution table {b'i} is calculated by the following equation.

$$b'_{i,F} = \min\left\{ \begin{array}{l} \text{round}\left\{ \log_2\left(1 + \frac{\frac{E_{target}}{count_F}SNR(i)}{\Gamma_{max}}\right)\right\} \\ \text{floor}\left\{\log_2\left(1 + \frac{E_{max} \cdot SNR(i)}{\Gamma_{max}}\right)\right\} \end{array} \right.$$ [Equation 6]

$$b'_{i,N} = \min\left\{ \begin{array}{l} \text{round}\left\{ \log_2\left(1 + \frac{\frac{E_{target}}{count_N}SNR(i)}{\Gamma_{max}}\right)\right\} \\ \text{floor}\left\{\log_2\left(1 + \frac{E_{max} \cdot SNR(i)}{\Gamma_{max}}\right)\right\} \end{array} \right.$$

wherein floor represents cutting off at decimal point. A cut off value below decimal point is derived as $diff_i$ expressed as follow (step S20).

When

When $bi = \text{floor}\left\{\log_2\left(1 + \frac{E_{max} \cdot SNR(i)}{\Gamma_{max}}\right)\right\}$ is obtained, [Equation 7]

$$diff_i = 0.5.$$

is obtained, $diff_i=0.5$.

In the other case $$diff_i = \left\{ \begin{array}{l} bi = \log_2\left(1 + \frac{\frac{E_{target}}{count_F}SNR(i)}{\Gamma_{max}}\right)(1 \in F) \\ bi = \log_2\left(1 + \frac{\frac{E_{target}}{count}SNR(i)}{\Gamma_{max}}\right)(1 \in N) \end{array} \right.$$

Here, $\Gamma_{max}$ is expressed by the foregoing equation (3). Pe is a bit error rate, $N_e$ is number of points having closest in an input signal constellation, and Q function is defined the foregoing equation (4). Then, $B_{total}$ is total bit number supported by the current bit distribution table at one multi-carrier symbol, in which $B_{total}=\Sigma b'i$. Here, $\Sigma$ is a sum of i=0 to N−1.

Then, when $B_{total}<B_{target}$ (step 23/YES) one bit is decreased for one bit from the current bit distribution table, i.e. the bit distribution table {b'i} of the carrier having minimum $diff_i$ value to establish $diff_1=diff_i-1$, $B_{total}=B_{total}-1$ (step S24). On the other hand, when $B_{total} \geq B_{target}$ (step 23/NO), one bit is increased for one bit from the current bit distribution table, i.e. the bit distribution table {b'i} of the carrier having minimum $diff_i$ value to establish $diff_i=diff_i+1$, $B_{total}=B_{total}+1$ (step S25). This process is repeated until $B_{total}=B_{target}$ is established (step S22/YES).

Figure 12:
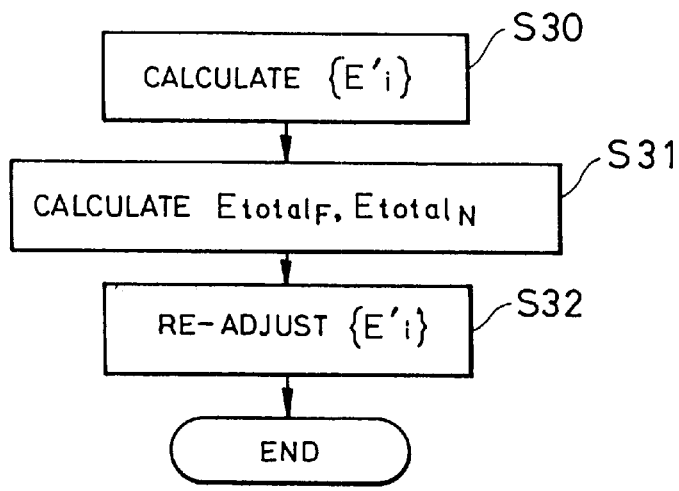
FIG. 12 is a flowchart showing another example of a calculation method of a power distribution at step A5 of FIG. 3.
Figure 13:
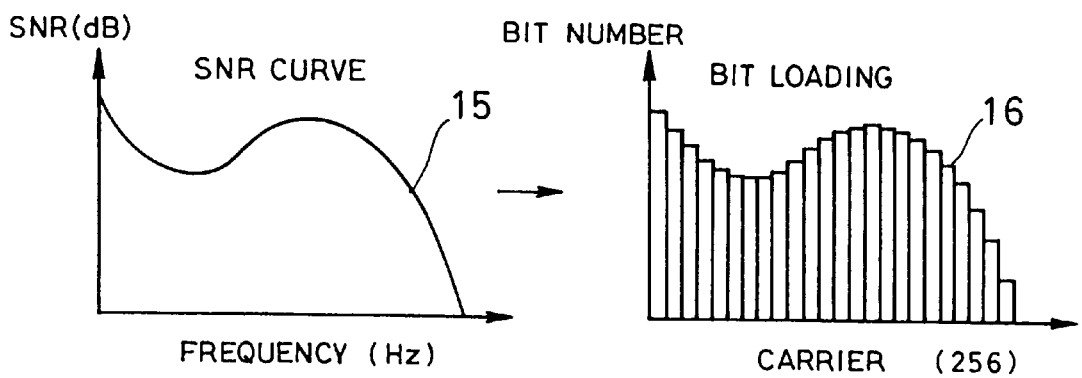
FIG. 13 is an illustration showing an example of the conventional bit distribution.
Figure 14:
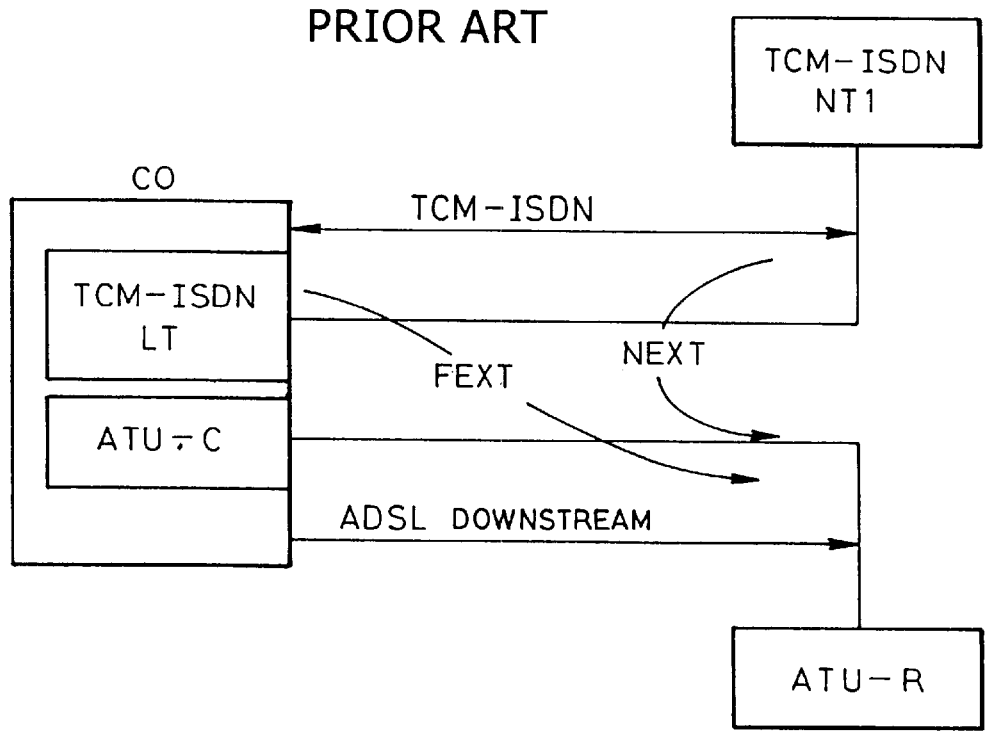
FIG. 14 is an illustration showing an example of occurrence of far end crosstalk and near end crosstalk.

FIG. 12 is a flowchart showing a calculation method of the power distribution table at step A5 of FIG. 3. At first, on the basis of the given bit distribution table {b'i}, an input power {E'i} is assigned so that $P_e(i)=P_{e,i,target}$ is established (step S30). Here, $P_e(i)$ is an error probability of the (i)th order carrier, $P_{e,i,target}$ is a target error probability of the (i)th order carrier. It should be noted that {E'i} is a total transmission power to be used by the (i)th order carrier.

The current total transmission power $E_{total,F}$ and $E_{total,N}$ are derived by the following equation (step 31).

$$E_{total,F} = \sum_{i \in F} E_i \qquad \text{[Equation 8]}$$

$$E_{total,N} = \sum_{i \in N} E_i$$

Here, $\Sigma$ is a sum of i=0 to N−1.

Then, final power distribution {E'i} is re-adjusted (step S32). The re-adjustment can be performed by setting smaller one of $E_{target}/E_{total,F}$, $E_{target}/E_{total,N}$ and $E_{max,i}$ as $E'_{i,F}$ or $E'_{i,N}$ from the following equations:

$$E'_{i,F} = \min \left\{ \begin{array}{l} \dfrac{E_{target}}{E_{total.F}} E_i \\ E_{maxi} \end{array} \right. \qquad \text{[Equation 9]}$$

$$E'_{i,N} = \min \left\{ \begin{array}{l} \dfrac{E_{target}}{E_{total.N}} E_i \\ E_{maxi} \end{array} \right.$$

Thus, the initial bit and the power distribution table in the shown system is provided as {b'i} and {E'i}.

The foregoing embodiments are directed for data transmission in the down direction, the identical process is applicable even for data transmission in up direction from the ATU-R 200 to the ATU-C 100. In such case, the construction provided in the ATU-C 100 in the foregoing embodiments is provided in the ATU-R 200, and, in turn, the construction provided in the ATU-R 200 in the foregoing embodiments is provided in the ATU-C 100.

As set forth above, according to the present invention, even when the noise amount is varied periodically, a bit distribution having maximum performance margin value relative to periodically varying noise amount can be obtained by regarding a plurality of SNR value due to periodically generated noise amount as SNR value of single line which does not cause variation in time and frequency band is increased.

On the other hand, as set forth above, according to the present invention, even when the noise amount is varied periodically, a bit distribution having maximum performance margin value relative to periodically varying noise amount can be obtained by given transmission speed depending upon a plurality of SNR values evaluated at different timing due to periodically varying noise.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For example, application of the present invention is not specified to the combination of the ISDN and ADSL presenting in the same cable, but to combinations of any DMT type communication system other than ADSL and ISDN on the common cable, for example. Furthermore, the present invention is applicable for the case where two or more kinds of periodic noise sources are present in the common cable.

What is claimed is:

1. A multi-carrier transmission system performing data transmission between first and second communication stations under presence of a plurality of periodically varying noises, comprising:

signal to noise ratio evaluating means for obtaining a plurality of sets of signal to noise ratios by evaluating signal to noise ratio of each carrier of the multi-carriers at different timing respectively corresponding to a plurality of kinds of noise environments; and bit distribution means for performing bit distribution of each carrier depending upon one set of signal to noise ratio with taking a plurality of sets of signal to noise ratios as one set of signal to noise ratio evaluated on different frequency at the same timing.

2. A multi-carrier transmission system as set forth in claim 1, wherein said signal to noise ratio evaluating means is constructed to derive the sets of the signal to noise ratios corresponding to each of two kinds of noise environments when two kinds of noise environments vary in regular interval period, and said bit distribution means is constructed for establishing said bit distribution with taking two kinds of signal to noise ratio sets as said one signal to noise ratio set.

3. A multi-carrier transmission system as set forth in claim 1, wherein said signal to noise ratio evaluating means is constructed to derive the sets of the signal to noise ratios corresponding to each of two kinds of noise environments when two kinds of noise environments vary irregular interval period, and said bit distribution means is constructed for establishing said bit distribution with taking two kinds of signal to noise ratio sets as said one signal to noise ratio set.

4. A multi-carrier transmission system as set forth in claim 1, wherein said bit distribution means performs bit distribution depending upon said one signal to noise ratio set and a power restriction value of each of said carriers.

5. A multi-carrier transmission system as set forth in claim 1, wherein, in case of data transmission from said first communication station to said second communication station, said first communication station includes means for transmitting a predetermined plurality of transmission speeds to said second communication station and said second communication station has said signal to noise ratio evaluating means and said bit distribution means, said bit distribution means includes means for deriving a margin in data transmission on the basis of a plurality of transmission speeds transmitted from said first communication station, means for selecting an optimal transmission speed from said plurality of transmission speed on the basis of the derived margin, and means for deriving bit distribution of each of said carriers according to the selected transmission speed.

6. A multi-carrier transmission system as set forth in claim 5, wherein said second communication station includes means for transmitting said bit distribution to said first communication station, and said first communication station performs data transmission to said second communication station according to said bit distribution.

7. A multi-carrier transmission system as set forth in claim 1, wherein noise sources of two kinds of noises are present on a common cable with a communication line between said first and second communication stations.

8. A multi-carrier transmission system as set forth in claim 1, wherein two kinds of noise environments are a first noise environment and a second noise environment having worse noise condition than said first noise environment.

9. A multi-carrier transmission system as set forth in claim 1, wherein two kinds of noises are caused by far end crosstalk and near end crosstalk.

10. A multi-carrier transmission system as set forth in claim 1 wherein a communication line for data transmission between said first and second communication stations is a digital subscriber line.

11. A multi-carrier transmission system performing data transmission between first and second communication stations under presence of a plurality of periodically varying noises, comprising:

signal to noise ratio evaluating means for obtaining a plurality of sets of signal to noise ratios by evaluating signal to noise ratio of each carrier of the multi-carriers at different timing respectively corresponding to a plurality of kinds of noise environments; and bit distribution means for performing bit distribution of each carrier for realizing a given transmission speed and a maximum performance margin depending upon respective values of a plurality of signal to noise ratio sets.

12. A multi-carrier transmission system as set forth in claim 11, wherein said signal to noise ratio evaluating means is constructed to derive the sets of the signal to noise ratios corresponding to each of two kinds of noise environments when two kinds of noise environments vary in regular interval period, and said bit distribution means is constructed for establishing said bit distribution with taking two kinds of signal to noise ratio sets as said one signal to noise ratio set.

13. A multi-carrier transmission system as set forth in claim 11, wherein said signal to noise ratio evaluating means is constructed to derive the sets of the signal to noise ratios corresponding to each of two kinds of noise environments when two kinds of noise environments vary irregular interval period, and said bit distribution means is constructed for establishing said bit distribution with taking two kinds of signal to noise ratio sets as said one signal to noise ratio set.

14. A multi-carrier transmission system as set forth in claim 11, wherein said bit distribution means performs bit distribution depending upon said one signal to noise ratio set and a total transmission power restriction value.

15. A multi-carrier transmission system as set forth in claim 11, wherein, in case of data transmission from said first communication station to said second communication station, said first communication station includes means for transmitting a predetermined plurality of transmission speeds to said second communication station and said second communication station has said signal to noise ratio evaluating means and said bit distribution means, said bit distribution means includes means for deriving a margin in data transmission on the basis of a plurality of transmission speeds transmitted from said first communication station, means for selecting an optimal transmission speed from said plurality of transmission speed on the basis of the derived margin, and means for deriving bit distribution of each of said carriers according to the selected transmission speed.

16. A multi-carrier transmission system as set forth in claim 15, wherein said second communication station includes means for transmitting said bit distribution to said first communication station, and said first communication station performs data transmission to said second communication station according to said bit distribution.

17. A multi-carrier transmission system as set forth in claim 11, wherein noise sources of two kinds of noises are present on a common cable with a communication line between said first and second communication stations.

18. A multi-carrier transmission system as set forth in claim 11, wherein two kinds of noise environments are a first noise environment and a second noise environment having worse noise condition than said first noise environment.

19. A multi-carrier transmission system as set forth in claim 11, wherein two kinds of noises are caused by far end crosstalk and near end crosstalk.

20. A multi-carrier transmission method performing data transmission between first and second communication stations under presence of a plurality of periodically varying noises, comprising:

signal to noise ratio evaluating step of obtaining a plurality of sets of signal to noise ratios by evaluating signal to noise ratio of each carrier of the multi-carriers at different timing respectively corresponding to a plurality of kinds of noise environments; and bit distribution step of performing bit distribution of each carrier depending upon one set of signal to noise ratio with taking a plurality of sets of signal to noise ratios as one set of signal to noise ratio evaluated on different frequency at the same timing.

21. A multi-carrier transmission method as set forth in claim 20, wherein said signal to noise ratio evaluating step is designed to derive the sets of the signal to noise ratios corresponding to each of two kinds of noise environments when two kinds of noise environments vary in regular interval period, and said bit distribution step is designed for establishing said bit distribution with taking two kinds of signal to noise ratio sets as said one signal to noise ratio set.

22. A multi-carrier transmission method as set forth in claim 20, wherein said signal to noise ratio evaluating step is designed to derive the sets of the signal to noise ratio corresponding to each of two kinds of noise environments when two kinds of noise environments vary in irregular interval period, and said bit distribution step is designed for establishing said bit distribution with taking two kinds of signal to noise ratio sets as said one signal to noise ratio set.

23. A multi-carrier transmission method as set forth in claim 20, wherein said bit distribution step performs bit distribution depending upon said one signal to noise ratio set and a power restriction value of each of said carriers.

24. A multi-carrier transmission method as set forth in claim 20, wherein, in case of data transmission from said first communication station to said second communication station, said first communication station includes step of transmitting a predetermined plurality of transmission speeds to said second communication station and said second communication station has said signal to noise ratio evaluating step and said bit distribution step, said bit distribution step includes step of deriving a margin in data transmission on the basis of a plurality of transmission speeds transmitted from said first communication station, step of selecting an optimal transmission speed from said plurality of transmission speed on the basis of the derived margin, and step of deriving bit distribution of each of said carriers according to the selected transmission speed.

25. A multi-carrier transmission method as set forth in claim 24, wherein said second communication station includes step of transmitting said bit distribution to said first communication station, and said first communication station performs data transmission to said second communication station according to said bit distribution.

26. A multi-carrier transmission method performing data transmission between first and second communication stations under presence of a plurality of periodically varying noises, comprising:

signal to noise ratio evaluating step of obtaining a plurality of sets of signal to noise ratios by evaluating signal to noise ratio of each carrier of the multi-carriers at different timing respectively corresponding to a plurality of kinds of noise environments; and bit distribution step of performing bit distribution of each carrier for realizing a given transmission speed and a maximum performance margin depending upon respective values of a plurality of signal to noise ratio sets.

27. A multi-carrier transmission method as set forth in claim 26, wherein said signal to noise ratio evaluating step is designed to derive the sets of the signal to noise ratios corresponding to each of two kinds of noise environments when two kinds of noise environments vary in regular interval period, and said bit distribution step is designed for establishing said bit distribution with taking two kinds of signal to noise ratio sets as one signal to noise ratio set.

28. A multi-carrier transmission method as set forth in claim 26, wherein said signal to noise ratio evaluating is designed to derive the sets of the signal to noise ratios corresponding to each of two kinds of noise environments when two kinds of noise environments vary irregular interval period, and said bit distribution step is designed for establishing said bit distribution with taking two kinds of signal to noise ratio sets as one signal to noise ratio set.

29. A multi-carrier transmission method as set forth in claim 26, wherein said bit distribution step performs bit distribution depending upon one signal to noise ratio set and a total transmission power restriction value.

30. A multi-carrier transmission method as set forth in claim 26, wherein, in case of data transmission from said first communication station to said second communication station, said first communication station includes step of transmitting a predetermined plurality of transmission speeds to said second communication station and said second communication station has said signal to noise ratio evaluating step and said bit distribution step, said bit distribution step includes step of deriving a margin in data transmission on the basis of a plurality of transmission speeds transmitted from said first communication station, step of selecting an optimal transmission speed from said plurality of transmission speed on the basis of the derived margin, and step of deriving bit distribution of each of said carriers according to the selected transmission speed.

31. A multi-carrier transmission method as set forth in claim 30, wherein said second communication station includes step of transmitting said bit distribution to said first communication station, and said first communication station performs data transmission to said second communication station according to said bit distribution.

32. A multi-carrier transmission method as set forth in claim 26, wherein noise sources of two kinds of noises are present on a common cable with a communication line between said first and second communication stations.

33. A multi-carrier transmission method as set forth in claim 26, wherein two kinds of noise environments are a first noise environment and a second noise environment having worse noise condition than said first noise environment.

34. A multi-carrier transmission method as set forth in claim 26, wherein two kinds of noises are caused by far end crosstalk and near end crosstalk.

35. A multi-carrier transmission method as set forth in claim 26, wherein a communication line for data transmission between said first and second communication stations is a digital subscriber line.

\* \* \* \* \*

UNITED STATES PATENT AND TRADEMARK OFFICE
CERTIFICATE OF CORRECTION

PATENT NO. : 6,510,184 B1
DATED : January 21, 2003
INVENTOR(S) : Yusaku Okamura

It is certified that error appears in the above-identified patent and that said Letters Patent is hereby corrected as shown below:

<u>Title page,</u>
Item [57], ABSTRACT,
Line 1, delete "thereofor" insert -- therefor --

<u>Column 10,</u>
Line 33, delete "20"
Line 46, delete "AS" insert -- A5 --

<u>Column 12,</u>
Lines 36 and 38, in Equation 7, delete "bi = $\ell og_2$" and "bi = $\ell og_2$" insert
-- bi – $\ell og2$-- and --bi – $\ell og2$ --

Signed and Sealed this

Twenty-fourth Day of June, 2003

JAMES E. ROGAN
*Director of the United States Patent and Trademark Office*